United States Patent [19]

Campbell

[11] Patent Number: 4,643,327
[45] Date of Patent: Feb. 17, 1987

[54] INSULATED CONTAINER HINGE SEAL

[76] Inventor: William P. Campbell, 2103 Bayside Dr., Corona del Mar, Calif.

[21] Appl. No.: 843,656

[22] Filed: Mar. 25, 1986

[51] Int. Cl.⁴ .............................................. B65D 6/10
[52] U.S. Cl. ............................ 220/215; 220/DIG. 8
[58] Field of Search ................ 220/215, 334, DIG. 8, 220/DIG. 9, DIG. 10, DIG. 14

[56] References Cited

U.S. PATENT DOCUMENTS

| | | |
|---|---|---|
| 1,366,542 | 1/1921 | Rinschler, Jr. . |
| 1,404,118 | 1/1922 | Gonnella . |
| 1,859,351 | 11/1920 | Gash . |
| 2,245,234 | 6/1941 | Tanner .......................... 220/DIG. 8 |
| 2,550,815 | 5/1951 | Inwood . |
| 2,562,609 | 10/1943 | Frohnapel . |
| 2,592,412 | 4/1952 | Frohnapel .......................... 220/215 |
| 2,780,386 | 2/1957 | Evans . |
| 3,429,141 | 9/1966 | Halseth . |
| 4,143,695 | 3/1979 | Hoehn ................................ 220/215 |

Primary Examiner—George T. Hall
Attorney, Agent, or Firm—George F. Bethel; Patience K. Bethel

[57] ABSTRACT

An insulated container for receiving food, beverages, ice, and the like having insulated side walls and a hinged cover. The hinged cover is hinged at an intermediate hinge point between first and second cover members wherein one of said covers has a channel extending from one side of the cover member to the other so that fluid flowing between said hinge point flows outwardly along said channel. The longitudinal edge of said channel has a bead which is received within a recess of said second cover member and a downward enlargement extending axially along said cover member extends into said channel. A further improvement includes sloping the channel so that gravitational flow of fluid can take place along said channel toward the exterior thereof. The entire container can be mounted on a cart for movement.

22 Claims, 5 Drawing Figures

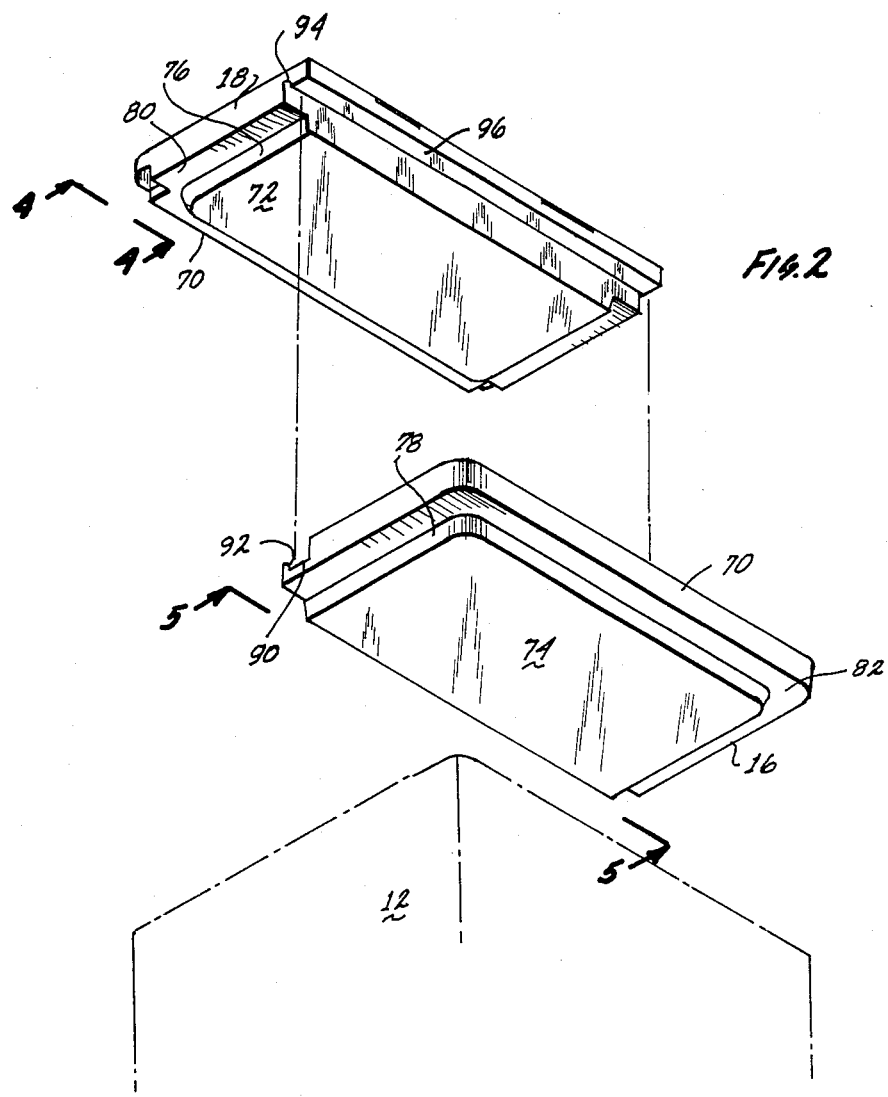
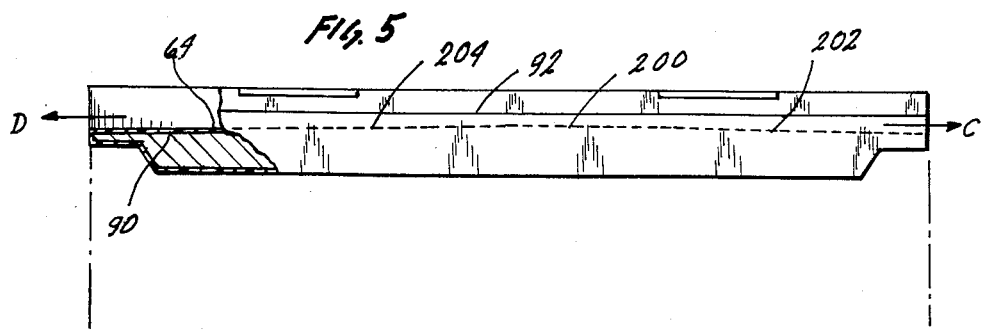

INSULATED CONTAINER HINGE SEAL

FIELD OF THE INVENTION

The field of this invention lies within the art of hinged containers. More particularly, it lies within the art pertaining to hinged insulated containers. Such insulated containers are of the type which hold hot and cold food, ice and beverages.

THE PRIOR ART

The prior art with regard to insulated containers incorporates a number of different types of containers. Some of the containers have double walls and hinged insulated lids. The containers are hinged at the center and incorporate a rubberized seal.

In other containers, there were triple walled containers with hollow lids and hinge members having fabric strips.

There were also ice chambers for food which could be added to compartments and multiple containers which could be stacked in various ways within an ice chest or ice chests in plural form.

In many of the hinged, sealed containers the hinge area overlapped or was open and subject to ingress and egress of fluid materials. More particularly, the hinge area had a space which allowed for the flow of fluids down through the lid of the container into the container. This flow of fluids into the container was oftentimes the result of spillage on top of the container.

The containers were generally used around food preparation areas or areas where food and beverages were served. Thus, when beverages were either laid on top or preparation of foods took place, spilling could take place on top of the container.

When spilling took place on top of the container, it had a tendency to leak into the container and contaminate or affect the food, ice, or beverages therein. This, of course, is deleterious not only from the standpoint of taste but also from the standpoint of the sanitary aspects.

In order to correct the foregoing the inventor herein has specifically incorporated a means to prevet spills from entering the container, while at the same time maintaining a hinged seal. The means for preventing the spills from entering the container constitute a channel with a bead thereon to provide for drainage to either end thereof. Drainage can then flow from the channel outwardly and over to the edges of the container.

An additional feature of this invention incorporates the aspects of allowing drainage to take place by gravitational flow from one point of the container lid to the outside thereof. This allows for a removal of liquids that have been spilled on the top so that they do not flow into the container.

SUMMARY OF THE INVENTION

In summation, this invention comprises a lid for a container that has been hinged with a bead and channel therein for the removal of liquids that have been spilled on the top along the channel and outwardly away from the container.

More specifically, the invention incorporates a container having a lid which is hinged and causes flow therefrom along a channel. The channel is provided on one lid member which receives another lid member in hinged relationship thereto. When fluid does spill onto the lid members, the fluid drains down through the hinge point into a channel which prevents flow downwardly through a split area into the container. Instead, the fluid flows along the channel outwardly toward the outside of the container and then down the sides thereof and not into the container.

The foregoing configuration is further enhanced by a gravitational slope to the channel so that fluids are directed by gravitational flow toward either side of the container along the channel.

The foregoing advantages will be seen as a substantial step over the prior art in preventing the introduction of fluids into a container when they have been spilled along the top.

BRIEF DESCRIPTION OF THE DRAWINGS

The invention will be more clearly understood by reference to the description below taken in conjunction with the accompanying drawings wherein:

FIG. 2 shows an exploded view of the hinged lid with the two portions of the lid being removed from each other insofar as their hinged relationship.

FIG. 5 shows a partially sectioned view as sectioned in the direction of line A of FIG. 2 and as seen in the direction of lines 5—5 of FIG. 2.

DESCRIPTION OF THE PREFERRED EMBODIMENTS

Figure 1:
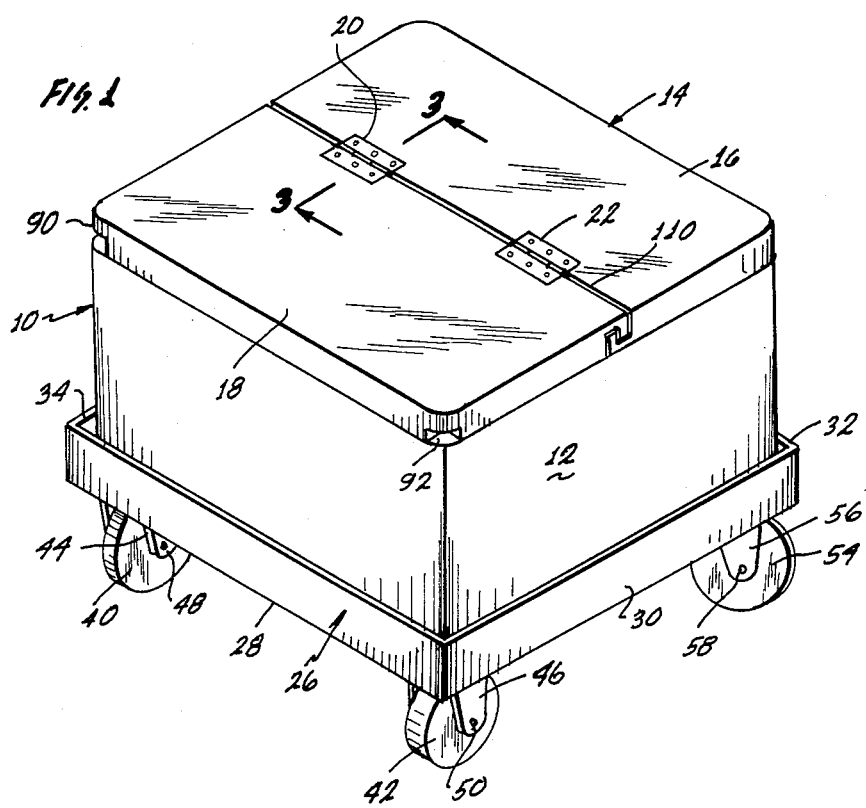
FIG. 1 shows a perspective view of an insulated hinged container implaced on a cart.

Looking more particularly at FIG. 1, it can be seen that a container 10 is shown having a rectangular box section 12 and a lid 14. The lid 14 is formed of two portions 16 and 18. The two portions 16 and 18 are hinged together by two respective hinges 20 and 22.

The two respective hinges can be in the form of any hinges or hingelike members, including living hinges formed of plastic, a continuous piano hinge, or any other means in order to hinge the respective top portions together. Suffice it to say, the top 14 is to be hinged together so that one portion, such as portion 18 can be lifted upwardly for access into the container. Also, the hinge allows for easy movement and removal of the top 14.

The boxlike portion 12 is seated within a cart 26. The cart 26 is comprised of either channel members or walled portions 28, 30, 32 and 34 which circumscribe the base thereof. The wall portions 28 through 34 form a base that is supported on four dolly wheels of which only three are seen.

Dolly wheels 40 and 42 are shown supported on brackets 44 and 46 with respective axles 48 and 50 for allowing the wheels 40 and 42 to rotate thereon. Two pivotal dolly wheels 54 and one unseen that is identical to it on the other side are shown supported on a bracket 56 having a pinlike axle 58. The bracket 56 is allowed to move rotationally on a vertical mounting pin connecting it to the wall 32 for pushing and steering of the entire container as supported on the cart 26.

The boxlike container 12 which receives the lid members or portions 16 and 18 is formed with an insulated wall which can be a double walled insulated member having foam therein or other suitable insulation. In the container 12 as shown, the walls are formed with double walled inner and outer plastic walls that are rotationally molded, blow molded or provided in any other suitable molding manner and are then filled with a foamlike material for insulation. The walls need not be filled with insulation, but can be maintained in any suitable manner in order to provide insulation suitable for holding heat or cold within the container.

The top lid 14 which is divided into the two portions 16 and 18 is also formed with double plastic walls such as the plastic wall 60 for lid member 16 and plastic wall 62 for lid member 18. The plastic walls are formed in a rotational molded or other type of molding operation such as blow molding.

Insulation such as insulation 64 and insulation 66 is incorporated into the walls by means of either providing expandable foam such as a polyurethane foam which is expanded in situ within the walls 60 and 62 after formation, or provided in any other suitable manner. Also in situ insulation can be used around which the walls 60 and 62 are formed. In addition thereto, the walls in the alternative can be formed as a single member being hinged together as members 16 and 18.

In order to seat the lid members or portions 16 and 18 into the side walls of the container 12, a lip 70 is utilized surrounding each of the lid members 16 and 18. The lip 70 is recessed with an inset boss or expanded portion 72 on lid 18 and 74 on lid 16. The inset portions 72 and 74 are inset by means of a champered flange edge 76 and 78 respectively. The champered edges 76 and 78 serve to provide a seating of the lids 16 and 18 against a generally horizontal surface 80 and 82 that surround the outer portions of the lid 16 and 18.

In order to gain access to the interior and fold the hinged lid member 18 backwardly, two hand grip insets 90 and 92 are utilized in order to allow for a grip to lift the lid 18 upwardly and fold it back onto the lid 16.

From the foregoing, it can be seen that the lid members 16 and 18 seat downwardly on the horizontal ledge portions 80 and 82 providing a seal at the flange sections or ledges 76 and 78 against the expanded boss or lower portion 72 and 74. The foregoing allows for an enhanced sealing of the lid members 16 and 18 against the side edges of the container 12.

In order to provide for the flow of fluids that have been spilled on the top of the container lids 16 and 18, a channel 90 is shown within the lid member 16. The channel 90 is provided along the edge of the lid member 16 in conjunction with a bead 92 along the edge thereof. The bead 92 seats within a recess 94 of the lid member 18. The recess 94 in turn terminates in a lowered elongated longitudinal expanded portion 96 which seats within the channel 90. The foregoing channel 90 and bead 92 help to seal the relationship between the lid as it seals within the recess 94 and expanded longitudinal portion 96.

In order to accommodate the hinges 20 and 22, a recess on the edge regions of the lids 16 an 18 is provided in the form of a recess 100 and 102. However, as previously stated any means to hinge the members 16 and 18 can be provided.

Figures 3, 4:
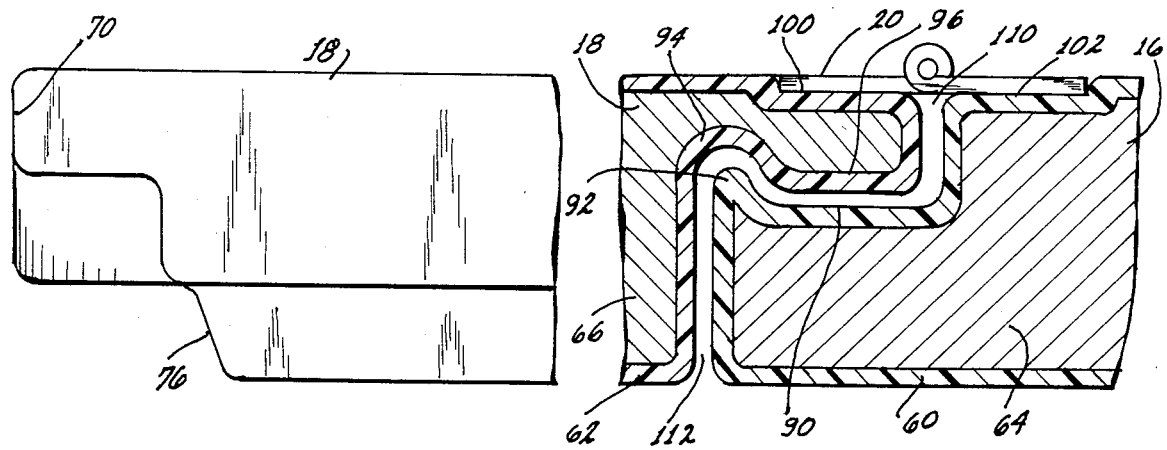
FIG. 3 shows a sectional view through the hinge point as sectioned along lines 3—3 of FIG. 1.
FIG. 4 shows a view of the corner edge region in the direction of lines 4—4 of FIG. 2.

From the foregoing, it can be seen that any fluid entering into the split or hinge joint 110 along the area between the lid members 16 and 18 can flow toward or away from the viewer of FIG. 3 and not downwardly through the opening 112 into the container.

Looking more particularly at FIG. 5 and the view that can be seen in FIG. 2 of lid 18, it can be seen that the channel 90 slopes from an apex 200 downwardly along sloping surfaces 202 and 204. Thus, fluid flowing through the opening split or hinge joint 110 will flow in the direction of arrow C or arrow D outwardly and down the edges of the boxlike container 12. The gravitational slope as can be seen affects spillage into the space 110 so that it flows out at either end downwardly along the slope of the channel 90. The slope of the channel 90 can be effectuated in any particular manner so long as it provides for flow away from the center and outwardly in the direction of lines C and D, so that fluids do not build up and flow over the bead 92 and into the interior of the container.

From the foregoing description, it can be seen that the invention specifically allows for the flow of fluids between a hinged opening to be received in a channel and caused to flow outwardly along the channel to the edge regions. This is an advance over the art. As a consequence, it is believed that the following claims should be read in their broadest scope and coverage in light of the prior art.

I claim:

1. A container for the storage of foods, beverages and the like having a lid thereover which is hinged wherein the improvement comprises:
    at least one first lid member hinged by hinge means to a second lid member for overlying said container having a split hinge point between said first and second lid members; and,
    a channel underlying said split hinge point in connected relationship to said first lid member providing a groove therealong so that when fluids flow between said lid members, they are allowed to flow along said channel and not be introduced into the interior of said container.

2. The container as claimed in claim 1 further comprising:
    said channel having a bead extending upwardly therefrom along an edge thereof.

3. The container as claimed in claim 2 further comprising:
    an expanded portion and a recess within said second lid member for overlying said channel and said bead respectively.

4. The container as claimed in claim 3 wherein:
    said container walls are insulated.

5. The container as claimed in claim 3 wherein:
    said lid members are insulated.

6. The container as claimed in claim 3 wherein:
    said walls and lid members are formed from a plastic inner and outer wall encapsulating a foam insulating material therebetween.

7. The container as claimed in claim 3 wherein:
    said channel slopes from a higher portion interiorly of said lid members outwardly to at least one edge.

8. The container as claimed in claim 7 wherein:
    the slope of said channel member proceeds from an apex between its ends in two directions sloping toward each end of the channel toward the exterior of said container.

9. The container as claimed in claim 8 wherein:
    said lid members have a stepped flange for seating within said container for sealing of the lid members thereinto.

10. The combination of a container and hinged lid for storing food, beverages, ice, and the like comprising:
    a container having walls and a bottom for the receipt of ice, food and beverages and the like;
    means for insulating said container;

a cover overlying said container formed of at least two cover members;

means for hinging said cover members together along a splint hinge point, so that said cover members can operatively open and close with respect to each other along said hinge point;

a channel within a first of said cover members longitudinally extending along an edge region thereof; and, means for hinging said second cover member to said first cover member overlying said channel.

11. The container as claimed in claim 10 further comprising:

a bead extending longitudinally along the edge of said channel of said first cover member.

12. The container as claimed in claim 11 further comprising:

a recess in said second cover member matched to said bead of said first member for receipt of said bead; and, a downwardly extending longitudinal enlargement formed in said second cover member extending longitudinally at least partially along the length of said first cover channel.

13. The container as claimed in claim 12 further comprising:

a channel having a sloping surface extending interiorly to the exterior of said channel to provide gravitational flow of fluids to the exterior of said channel.

14. The container as claimed in claim 13 further comprising:

insulated side walls and cover members provided by foam expanded into plastic walls members.

15. The container as claimed in claim 14 further comprising:

a recess within at least one of said covers for providing a grip to lift one cover member with respect to the other.

16. The combination of an insulated container and a hinged lid for the receipt of foods, beverages, ice, and the like for the maintenance of temperature thereof, wherein the improvement comprises:

a container formed of inside and outside walls which have been molded with a cavity therebetween.

at least one first and second cover member having a hinge point separating said cover members and formed of plastic having an inside and outside wall with a space therebetween;

foam insulation means between the space within said first and second cover members and said container walls;

a hinge means for hinging said first and second cover members together; and, a channel within at least one of said cover members extending underneath said hinge point.

17. The combination as claimed in claim 16 further comprising:

wheels in connected relationship to said container for moving said container.

18. The combination as claimed in claim 17 further comprising:

a wheeled cart having casters attached thereto forming said wheels upon which said container is mounted and moved.

19. The combination as claimed in claim 18 wherein:

said channel member has a bead extending along an edge portion thereof; and, said second cover member has a recess for receiving said bead.

20. The combination as claimed in claim 19 further comprising:

a ledge for receipt along the edge regions of said container; and, a boss extending thereinto for providing a sealant within said container.

21. The combination as claimed in claim 18 further comprising:

an expanded portion of said second container cover extending downwardly into said channel; and wherein, said insulation means within the space between said plastic walls comprises a polyurethane expanded foam.

22. The combination as claimed in claim 18 further comprising:

said channel slopes from at least one portion thereof to another portion exteriorly thereof so that fluids can flow gravitationally toward the edges.

* * * * *